United States Patent
DeFife et al.

[19]

[11] Patent Number: 6,150,035

[45] Date of Patent: Nov. 21, 2000

[54] MULTI-LAYER COMPOSITES AND SHEET LABELS

[75] Inventors: James R. DeFife, Mentor; Robert J. Williams, Painesville; John C. Kokay, Chesterland; David M. Gustafson, Willoughby, all of Ohio

[73] Assignee: Avery Dennison Corporation, Pasadena, Calif.

[21] Appl. No.: 08/279,046

[22] Filed: Jul. 22, 1994

Related U.S. Application Data

[63] Continuation-in-part of application No. 08/222,078, Apr. 1, 1994, abandoned.
[51] Int. Cl.[7] .................................................. B32B 27/00
[52] U.S. Cl. ......................... 428/500; 428/195; 428/212; 428/354; 428/411.1; 428/488.4; 428/511; 428/515
[58] Field of Search .............................. 428/40, 343, 354, 428/218, 513, 509, 511, 512, 352, 447, 500, 195, 212, 411.1, 515; 283/81

[56] References Cited

U.S. PATENT DOCUMENTS 3,575,910   4/1971   Thomas ................................. 260/29.6

(List continued on next page.)

OTHER PUBLICATIONS

Radiation Curable Silicones, TEGO RC 726 Data Sheet, TH. Goldschmidt AG.

(List continued on next page.)

*Primary Examiner*—William Krynski
*Attorney, Agent, or Firm*—Renner, Otto, Boisselle & Sklar

[57] ABSTRACT

A composite laminate suitable for preparing labels is described. The composite laminate, in one embodiment, comprises (A) a substrate sheet of paper;

(B) a first coating of polyolefin film having a printable upper surface and a lower surface bonded to the upper surface of the substrate sheet;

(C) a second coating of polyolefin film having its upper surface bonded to the lower surface of the substrate sheet; and (D) a third coating comprising a pressure-sensitive adhesive on the lower surface of the second coating of polyolefin film. These composites may be used as the face of other composites such as labels, tapes, etc. These composite laminates exhibit film-like performance and paper-like strength. When the face laminates are matched with a complimentary release liner, the resulting composite laminate resists curling when exposed to the extremes of temperature and moisture, and the exposed upper surface of said laminates can be imprinted xerographically by means of laser printers or other copying machines with or without the application of primers, inks and over-varnishes required of many prior art laminates.

In another embodiment, composite liner laminates are described which comprises

(A) a substrate sheet of paper;

(B) a first coating of polyolefin film having an upper surface and a lower surface wherein the lower surface is in contact with and bonded to the upper surface of the substrate sheet;

(C) a second coating of polyolefin film having its upper surface in contact with and bonded to the lower surface of the substrate sheet; and (D) a resin coating in contact with and bonded to the lower surface of the second coating of polyolefin film said resin coating having a coefficient of friction which is greater than the coefficient of friction of the second coating of polyolefin film.

26 Claims, 1 Drawing Sheet

U.S. PATENT DOCUMENTS

| | | | |
|---|---|---|---|
| 3,726,710 | 4/1973 | Berger et al. | 117/93.31 |
| 3,749,593 | 7/1973 | Keiser | 117/68 |
| 3,759,807 | 9/1973 | Osborn et al. | 204/159.23 |
| 3,878,263 | 4/1975 | Martin | 260/825 |
| 4,004,058 | 1/1977 | Buros et al. | 428/215 |
| 4,016,333 | 4/1977 | Gaske et al. | 428/447 |
| 4,026,526 | 5/1977 | Yoshida et al. | 260/25 |
| 4,064,286 | 12/1977 | Hahn | 427/44 |
| 4,201,808 | 5/1980 | Cully et al. | 428/40 |
| 4,301,268 | 11/1981 | Kropac | 528/26 |
| 4,306,050 | 12/1981 | Koerner et al. | 528/26 |
| 4,398,985 | 8/1983 | Eagon | 156/233 |
| 4,722,865 | 2/1988 | Huizer | 428/407 |
| 4,824,875 | 4/1989 | Gutek | 522/9 |
| 4,859,511 | 8/1989 | Patterson et al. | 428/40 |
| 4,908,274 | 3/1990 | Jackmann et al. | 428/452 |
| 4,956,221 | 9/1990 | Gutek | 428/142 |
| 4,963,438 | 10/1990 | Weitemeyer | 428/447 |
| 4,978,726 | 12/1990 | Döhler et al. | 525/479 |
| 5,034,084 | 7/1991 | Schafer et al. | 156/278 |
| 5,034,491 | 7/1991 | Wewers et al. | 528/41 |
| 5,057,579 | 10/1991 | Fock et al. | 525/329.5 |
| 5,104,847 | 4/1992 | Hann et al. | 503/227 |
| 5,115,039 | 5/1992 | Fock et al. | 525/329.5 |
| 5,115,040 | 5/1992 | Fock et al. | 525/329.5 |
| 5,128,391 | 7/1992 | Shustack | 522/92 |
| 5,145,914 | 9/1992 | Esselborn et al. | 525/329.5 |
| 5,154,956 | 10/1992 | Fradrich | 428/40 |
| 5,160,777 | 11/1992 | Woodward et al. | 428/172 |
| 5,326,624 | 7/1994 | Tsubaki et al. | 428/213 |
| 5,439,748 | 8/1995 | Nakamura et al. | 428/511 |

OTHER PUBLICATIONS

TMPTA Monomer Data Sheet, Radcure Specialties Inc. Feb., 1990.

ODA Monomer Data Sheet, Radcure Specialties Inc., Feb. 1990.

HDODA Monomer Data Sheet, Radcure Specialties, Inc., Feb. 1990.

Uvecryl 7100, Data Sheet, Radcure Specialties, Inc., Feb. 1990.

EB Curable Release Coatings, Skeist Inc., pp. 622–628.

Chem Abstract, 162113s, vol. 119, 1993, p. 96.

"Converter Materials,"Paper Film Fork Converter, Apr. 1994.

"Advances in Release Liner Tech. Offer High Performance Economics", pp. 26–28.

MULTI-LAYER COMPOSITES AND SHEET LABELS

CROSS REFERENCE TO RELATED APPLICATION

This application is a continuation-in-part of U.S. application Ser. No. 08/222,078, filed on Apr. 1, 1994, now abandoned. The specification of this earlier application is hereby incorporated by reference in its entirety.

TECHNICAL FIELD

This invention relates to laminate materials. More particularly, the invention relates to composite multi-layer laminate materials suitable for use as the face of pressure-sensitive sheet labels, decals and tapes.

BACKGROUND OF THE INVENTION

Articles such as decals, labels, tapes, etc., which employ an adhesive-back printed or printable surface have been in general use for many years. The basic construction of a decal or sheet label comprises (1) a face, (2) a liner or backing material, and (3) a layer pressure-sensitive adhesive between the face and the liner. Because the surface of the liner which is in contact with the pressure-sensitive adhesive is coated with a release agent, the strength of the adhesive bond to the face is greater than to the liner. Thus, when the liner is peeled from the face, the pressure-sensitive adhesive remains attached to the back of the face. The face comprises at least one layer of sheet or film material, and the liner also comprises one or more layers of sheet or film material.

The portion of the article which remains after the liner has been removed from the pressure-sensitive adhesive backing is the desired pressure-sensitive adhesive-backed label, tape or decal which generally comprises a multi-layer face and the pressure-sensitive adhesive. The faces of labels may be made from various materials, and in some applications, it is desired to prepare the label from paper because of its low cost, strength and printability. In other applications, it is desired to use non-paper materials such as polymeric sheet materials which are often preferred because of their toughness, resistance to moisture and improved film characteristics. In some instances, prior art labels and the release liners used therewith have both been made from paper. Alternatively, the face is made from one material such as polyvinyl chloride and the liner is made from a different material such as paper, or the face is made of paper and the liner comprises a polymer film such as a polyvinyl film.

One of the advantages of pressure-sensitive adhesive-coated labels with release liners is that information can be printed on the label prior to attaching the label to another article such as a package, a shelf, etc. It is desirable that such information can be recorded on such labels utilizing laser printers or copying machines. Therefore, the labels and release liners must be able to withstand the conditions of the laser printers and copying machines such as elevated temperatures, pressures, etc. In many instances, attempts to print labels utilizing laser printers and copiers results in unacceptable curling of the label due at least in part to the high temperatures to which the label is subjected during the printing process. Curling of the label is undesirable because the curled labels may jam in the printer and/or the desired printed image will be fuzzy or uneven and unacceptable.

Various attempts have been made to eliminate or reduce curling in pressure-sensitive adhesive-backed labels by using various materials and combinations of materials in the face and release liners. Some of the attempts which have been made have been summarized in U.S. Pat. No. 5,154,956 (Fradrich) which describes a xerographically printable label. In particular, the label described in the '956 patent comprises a layer of sheet material, e.g., paper or polyvinyl chloride film having a printable upper surface and an adhesive-coated lower surface, and a release liner removably adhering to the lower surface of the layer of the sheet material. The release liner comprises a first layer of paper having a release coating on its upper surface, a water-impermeable adhesive on its lower surface, and a layer of textured paper (for example, embossed paper) bonded to the lower surface first layer of the water-impermeable adhesive. The presence of the textured paper is reported to provide the adhesive label with non-curling properties.

U.S. Pat. No. 5,154,956 also describes a prior attempt to eliminate or reduce curling which used release liners comprised of a sheet of paper sandwiched between two layers of polyethylene film with one of the polyethylene layers having a release agent coated on its outer surface. The patentee reports that such prior attempts have been unsuccessful because the polyethylene film-covered release liners have a tendency to acquire a static electric charge which prevents the labels from feeding smoothly into laser printers and copying machines.

SUMMARY OF THE INVENTION

A composite laminate suitable for preparing labels is described. The composite laminate, in one embodiment, comprises: (A) a substrate sheet of paper; (B) a first coating of polyolefin film having a printable upper surface and a lower surface bonded to the upper surface of the substrate sheet; and (C) a second coating of polyolefin film having its upper surface bonded to the lower surface of the substrate sheet, and (D) a third coating comprising a pressure-sensitive adhesive on the lower surface of the second coating of polyolefin film. These composites may be used as the face of other composites such as labels, tapes, etc. These composite laminates exhibit film-like performance and paper-like strength. When matched with a complementary release liner, the resulting composite laminate resists curling when exposed to the extremes of temperature and moisture, and the exposed upper surface of said laminates can be imprinted xerographically by means of laser printers or other copying machines with or without the application of primers, inks and over-varnishes required of many prior art laminates.

DESCRIPTION OF THE PREFERRED EMBODIMENTS

The composite laminates of the present invention include, as one layer, a substrate sheet of paper. Paper substrates are particularly useful because of the wide variety of applications in which they can be employed. Any type of paper having sufficient tensile strength to be handled in conventional paper coating and treating apparatus can be employed as the substrate layer. The paper used depends upon the end use and particular personal preferences. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. Examples of specific papers which can be utilized as substrates in preparing the deposit laminates of the present invention include 41-pound offset grade bleached Kraft; 50-pound bleached Kraft paper, etc.

In the composite laminates of the present invention, the substrate sheet of paper contains a first coating which comprises a polyolefin film (B) with its lower surface bonded to the upper surface of the substrate. The upper surface of the first coating comprising a polyolefin film (B) is characterized as having a printable upper surface. That is, information can be recorded on the upper exposed surface of the first coating of polyolefin film by various techniques such as by laser printers and copying machines. In addition, the upper surface of the first coating of polyolefin also is receptive to primers, inks and over-varnishes which may, in some instances, improve the printability of the surface.

The polyolefin film may comprise polymers and copolymers of monoolefins having from, for example, 2 to 12 carbon atoms, preferably 2 to 8 carbon atoms. Most preferred are the polymers of α-olefins having from 2 to 4 carbon atoms per molecule. Examples of said homopolymers include polyethylene, polypropylene, poly-1-butene, etc. An example of a copolymer within the above definition is a copolymer of ethylene with 1-butene having from 1 to 10, preferably from 1 to 5 and more preferably from 1 to 3 weight percent of the 1-butene comonomer incorporated into the copolymer molecule. Blends of copolymers with polyisobutylene also are useful, and examples of such blends include those blends containing up to about 35 weight percent, preferably from 1 to 35 weight percent of polyisobutylene and from 99 to 65 weight percent of a copolymer of ethylene, another comonomer such as 1-butene. Polyethylene and polypropylene are presently preferred coating materials, and polyethylene is the most preferred film material.

The polyethylene film of the first coating may be derived from polyethylenes having various densities including low, medium and high. The low density range is from about 0.910 to about 0.925; the medium density polyethylene is from about 0.925 to about 0.940; and the high density polyethylene is characterized as having a density of 0.940 to about 0.965. These three density ranges are sometimes referred to as types I, II and III, respectively. In one embodiment, it is preferred that the first coating of polyethylene film is a high-density polyethylene film. In another embodiment, the first coating of polyethylene film is derived from a low-density polyethylene. The first coating may have a gloss or matte finish.

The composite laminates of the present invention also comprise (C) a second coating of polyolefin film having its upper surface bonded to the lower surface of the substrate sheet (A). In this embodiment, the printable upper surface of the first coating (B) and the lower surface of the second coating of polyolefin film (C) are free of any release coatings. Any of the polyolefin films described above as useful in the first coating (B) may be used in the second coating. Polyethylene and polyolefin films are particularly useful, and a polyethylene film are presently preferred.

In one embodiment, a balanced construction is utilized. That is, the polymer film of the second coating is of the same polymer used to form the first coating. In this construction, the second film is polyethylene when the first film is polyethylene and the second film is polypropylene when the first film is polypropylene. The densities of the two films may be the same or different.

The second coating of polyethylene film (C) may be prepared from high-density polyethylene, low-density polyethylene, or medium-density polyethylene. In one embodiment, the first and second coatings of polyethylene film may be derived from the polyethylene of the same density (that is, both the first coating and the second coating may be high-density polyethylene or low-density polyethylene), or the two coatings of polyethylene film may be derived from polyethylenes of different densities. Thus, the first coating can be high-density polyethylene and the second coating a low-density polyethylene, or the first coating can be derived from a low-density polyethylene, and the second coating derived from a high-density polyethylene. The selection of the densities of the first and second coatings of polyethylene film will depend upon the intended application and the desired properties which can be varied by varying the polyethylene densities.

The polyolefin layers can be extrusion-coated onto the paper substrate (A) at extrusion temperatures such as within in the range of from about 210° C. to about 270° C. using any standard extrusion process known to the art. The process is conveniently carried out in a continuous manner, and the weight of the first and second coatings of polyethylene applied to the paper substrate will usually be within the range of from about 3 to about 30, and preferably from about 5 to about 20 pounds per ream. For example, the first coating of polyethylene film may be a high-density of polyethylene applied at from about 5 to about 10 pounds per ream, and the second coating of polyethylene film may comprise a linear low-density polyethylene applied at about 15 to 20 pounds per ream.

Although the polyolefin film coatings described above are referred to as "a first coating" and "a second coating," these terms are utilized herein to reference the various coatings on the paper substrate and in the composite laminate and are not intended to indicate any order of application. In fact, the composite laminate can be prepared by initially applying either of the above-described polyolefin film coatings followed by application of other film to the other surface of the paper substrate. Alternatively, the two polyolefin films can be co-extruded onto the paper substrate.

In one embodiment, it is desired to subject the first coating of polyolefin film having a printable upper surface to a high-energy electrical discharge (or plasma) such as the high-energy electrical discharges produced by corona discharge and glow discharge which are well known in the industry. Corona discharge is a high-energy, high-ionizing discharge which is produced at electrodes when a high-voltage is applied across the plates of a condenser (capacitor). The corona discharge treatment improves the surface energy of the upper surface of the first coating and improves the printability of the surface.

In one embodiment, the composite laminate of the invention is prepared by applying the first coating of polyolefin film (B) on a substrate sheet of paper and treating the first coating of polyolefin film with a corona discharge prior to applying the second coating of polyolefin film (C) to the lower surface of the substrate sheet. In another embodiment, the first coating of polyolefin film (B) is applied to the upper surface of the substrate sheet of paper (A), and the second coating of polyolefin film (C) is applied to the lower surface of the substrate sheet, and the first coating of polyolefin film (B) is then given a corona discharge treatment. In another alternative embodiment, the second coating of polyolefin film (C) can be applied to the lower surface of the substrate sheet of paper followed by the application of the first coating of polyolefin film (B) to the upper surface of the substrate sheet of paper. The first coating of polyolefin film in this composite laminate can then be subjected to a corona discharge treatment if desired.

In one embodiment of the present invention, the composite laminate comprises (A) a substrate sheet of paper; (B) a first coating of polyolefin film having a printable upper surface and a lower surface bonded to the upper surface of the substrate sheet; (C) a second coating of polyolefin film having its upper surface bonded to the lower surface of the substrate sheet; (all as described above) and (D) a third coating comprising a pressure-sensitive adhesive on the lower surface of the second coating of polyolefin film. This type of composite laminate is useful particularly as the face portion of a sheet label, tape, etc.

Any pressure-sensitive adhesive composition known in the art can be applied to the composite of the present invention as a third coating. Such adhesive compositions are described in, for example, "Adhesion and Bonding," *Encyclopedia of Polymer Science and Engineering*, Vol. 1, pp. 476–546, Interscience Publishers, Second Ed., 1985. Such compositions generally contain an adhesive polymer such as natural or reclaimed rubbers, styrene-butadiene rubber, styrene-butadiene or styrene-isoprene block copolymers, polyisobutylene, poly(vinylether) or poly(acrylic)ester as a major constituent. Other materials may be included in the pressure-sensitive adhesive composition such as resin tackifiers including rosin esters, oil-soluble phenolics and polyterpenes; antioxidants; plasticizers such as mineral oil or liquid polyisobutylene; and fillers such as zinc oxide or hydrated alumina. The selection of the pressure-sensitive adhesive to be used in any composites of the invention is not critical to this invention, and those skilled in the art are familiar with many suitable pressure-sensitive adhesives for particular applications.

The third coating of pressure-sensitive adhesive can be applied by techniques known to those skilled in this art and at coating weights between about 1 and 100 gms/m$^2$. If desired, the second coating of polyolefin film can be activated prior to application of the third coating of pressure-sensitive adhesive to improve the bond between the second and third coatings. The surface of the polyethylene can be activated by treatments such as flame oxidation; chemical oxidation; treatment with a variety of agents such as ozone, chlorine and various acids; various forms of electrical bombardment or discharge treatments such as corona discharge, glow discharge, etc., using readily available equipment and known techniques.

Figure 1:
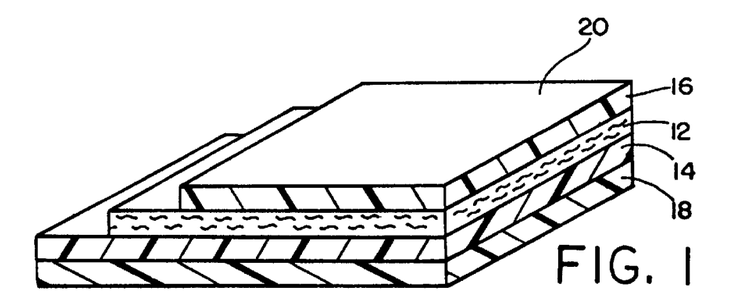
FIG. 1 is a cross-section of a composite laminate in accordance with the present invention which comprises four layers.

Composite laminates containing a third coating of pressure-sensitive adhesive are illustrated in FIG. 1 wherein the composite is generally referred to by reference numeral 20. The composite comprises a substrate sheet of paper 12, a first coating of polyolefin film 16 on the upper surface of the paper substrate 12, a second coating of polyolefin film 14 bonded to the lower surface of the paper substrate 12, and a third coating of pressure-sensitive adhesive 18 which is in contact with and bonded to the lower surface of the second coating of polyolefin film 14.

Figure 2:
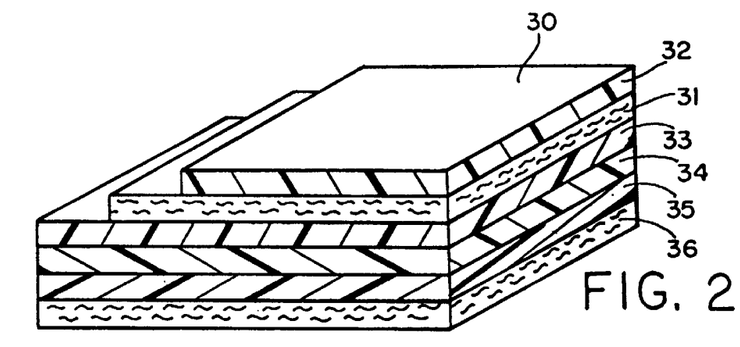
FIG. 2 is a cross-section of another composite laminate in accordance with the present invention which comprises six layers.

In another embodiment, the composite laminate of the invention described above and illustrated in FIG. 2 is matched with a complementary release liner. In this embodiment, the composite laminate comprises (A) a first sheet of paper; (B) a first coating of polyolefin film having a printable upper surface and a lower surface bonded to the upper surface of the substrate sheet; (C) a second coating of polyolefin film having its upper surface bonded to the lower surface of the substrate sheet; (D) a third coating comprising a pressure-sensitive adhesive on the lower surface of the second coating of polyolefin film; and (E) a release-coated liner comprising at least one layer of sheet material wherein the release-coated surface of the liner is in contact with the third coating of pressure-sensitive adhesive. This embodiment is illustrated in FIG. 2 wherein the composite is generally referred to by reference numeral 30. The composite comprises a substrate sheet of paper 31 having the first coating of polyolefin film 32 bonded to the upper surface of substrate 31 and a second coating of polyolefin film 33 which is bonded to the lower surface of the substrate 31. A third coating comprising a pressure-sensitive adhesive 34 is in contact with the lower surface of the second coating of polyethylene film 33. A coating of release composition 35 is bonded to liner 36, and the release composition also is in contact with the third coating of pressure-sensitive adhesive 34.

The release-coated liner is illustrated in FIG. 2 as comprising sheet material 36 having a release coating 35 on its upper surface. Sheet 36 may comprise one or more sheets of any paper material or polymer film. Sheet 36 may be prepared from any fibrous cellulose material in sheet form made by chemical, mechanical or chemical-mechanical processes. In one embodiment, sheet 36 is made from Kraft paper. Sheet 36 also may comprise a film of one or more polymers. The polyolefin film may comprise polymers and copolymers of monoolefins having from, for example, 2 to 12 carbon atoms, preferably 2 to 8 carbon atoms. Most preferred are the polymers of $\alpha$-olefins having from 2 to 4 carbon atoms per molecule. Examples of said homopolymers include polyethylene, polypropylene, poly-1-butene, etc. An example of a copolymer within the above definition is a copolymer of ethylene with 1-butene having from 1 to 10, preferably from 1 to 5 and more preferably from 1 to 3 weight percent of the 1-butene comonomer incorporated into the copolymer molecule. Blends of copolymers with polyisobutylene also are useful, and examples of such blends include those blends containing up to about 35 weight percent, preferably from 1 to 35 weight percent of polyisobutylene and from 99 to 65 weight percent of a copolymer of ethylene, another comonomer such as 1-butene. Polyethylene and polypropylene are presently preferred materials, and polyethylene is most preferred. The useful polyethylenes include the low density polyethylenes medium-density polyethylenes and high density polyethylenes. The selection of a high density or low density polyethylene will depend upon the intended application and the types of materials which the exposed surface of the polyolefin film will contact in use.

Release-coated liners useful in the laminates of the present invention may comprise a release-coated laminate comprising more than one sheet material including alternating layers of paper and polymer to provide desirable properties. The following examples of laminates illustrate these types of laminates which may be utilized as the release-coated liners in the composite laminates of the invention: release composition/polyethylene/paper; release composition/paper/polyethylene; releasecomposition/ polyvinylchloride/paper;releasecomposition/polyethylene/ paper/polyethylene/tissue; etc. In these examples of release-coated liners, the polyethylene films may range from low-density to high-density as described earlier, and the paper materials may be any of the paper materials described earlier with respect to the face portion of the composite laminates.

In another embodiment, release-coated liners may be prepared from a composite laminate comprising (A) a substrate sheet of paper; (B) a first coating of polyolefin film having an upper surface and a lower surface wherein the lower surface is bonded to the upper surface of the substrate sheet; (C) a second coating of polyolefin film having its upper surface bonded to the lower surface of the substrate sheet; (all as described above) and (F) a coating of a polymer resin on the lower surface of the second coating of polyolefin film (C), said polymer resin coating having a coefficient of friction greater than the coefficient of friction of the second coating of polyolefin film (C). The coating (F) is utilized to increase the coefficient of friction of the bottom layer of the laminate, and coating (F) generally is used in lieu of the bottom sheet of paper generally used with release-coated liners as protection for the adjacent polymer layer and to provide an increase in the coefficient of friction of the otherwise exposed layer of the liner whereby the composite label, tape, etc., can be advanced through various equipment with reduced difficulty. The use of the polymer resin coating (F) in lieu of a paper backing also generally results in improved resistance to curling, particularly at extremely low temperatures.

The polymer resin coating (F) may comprise any polymer resin which has a coefficient of friction greater than the coefficient of friction of the second polyolefin layer (C), and does not otherwise have a negative effect on the composite. For example, the polymer resin coating (F) should not increase the tendency of the laminates to curl at either low or high temperatures. A wide variety of resins, particularly thermoplastic resins, can be used to form the coating layer (F). Examples of such resins include polymers and copolymers such as polyester resins, polyacrylic resins, polyvinyl aromatic resins, ethylene vinylacetate resins (EVA), block copolymers of vinyl aromatic compounds and conjugated dienes, and blends thereof, etc. Polymers and copolymers of vinyl aromatic compounds have been found to be particularly useful as coating (F). Monomers which may copolymerized with vinyl aromatic monomers include at least one monomer selected from the group consisting of acrylic acid or ester, methacrylic acid or ester, acrylonitrile and maleic anhydride.

The vinyl aromatic monomer includes styrene and the various substituted styrenes. In one embodiment, the vinyl aromatic monomer is represented by the following formula wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound. Specific examples of polymers of vinyl aromatic compounds include polystyrene, poly(alpha-methylstyrene), poly(p-methylstyrene), etc.

In another embodiment, the polymer of coating (F) is a copolymer of a vinyl aromatic monomer and a monomer selected from the group consisting of an unsaturated mono- or dicarboxylic reagent and other vinyl monomers such as acrylonitrile. The carboxylic reagents include carboxylic acids per se and their functional derivatives such as anhydrides, imides, metal salts, esters, etc., which are capable of forming polymers with the vinyl aromatic monomer.

The unsaturated monocarboxylic acid reagents are carboxylic acids and esters corresponding to the formula $$RCH=C(R_1)COOR_2$$

wherein R is hydrogen or a saturated aliphatic or alicyclic, aryl, alkaryl or heterocyclic group; $R_1$ is hydrogen or an alkyl group; and $R_2$ is hydrogen or an alkyl, aryl, or heterocyclic group. Preferably, R is hydrogen or an alkyl group containing from 1 to about 10 carbon atoms. Preferably, $R_1$ is hydrogen or an alkyl group containing from 1 to about 10 carbon atoms. Preferably, $R_2$ is hydrogen or an alkyl group having from 1 to about 10 carbon atoms. The total number of carbon atoms in $R_1$ and $R_2$ should not exceed 18 carbon atoms. Specific examples of useful monobasic carboxylic reagents include acrylic acid, methacrylic acid, crotonic acid, acrylic anhydride, etc. Specific examples of esters include methyl, ethyl, propyl, and butyl acrylate and methacrylate.

Specific examples of such copolymers include copolymers of: styrene-acrylic acid; styrene methacrylic acid; styrene-methylacrylate; styrene-methylmethacrylate; α-methyl styreneacrylic acid; etc. One example of a commercially available styrene-acrylic acid resin which is useful in the present invention is Joncryl 98 available from S.C. Johnson Wax, Racine, Wis. Joncryl 98 is an emulsion reported to contain 45–55% by weight of a styrene acrylate polymer, 1–3% by weight of a surfactant, 45–55% by weight of water and 1–3% of ammonium hydroxide.

In another embodiment, the unsaturated carboxylic reagent is a dicarboxylic reagent. An example of dicarboxylic reagents are maleic reagents. The maleic reagents may generally be represented by the formula wherein each R group is hydrogen or an aliphatic or aromatic hydrocarbyl group or the two R groups are joined together to form a fused ring derivative, X is —O— or >NR$^2$ where R$_2$ is a hydrocarbyl group which may be an aliphatic or an aromatic hydrocarbyl group such as phenyl, methyl, ethyl, propyl, butyl, etc. Preferably both R groups are hydrogen.

Examples of maleic derivatives which are cyclic or bicyclic compounds include those obtained by a Diels-Alder reaction of butadiene with maleic anhydride or a maleimide. Those obtained by a Diels-Alder reaction of cyclopentadiene with maleic anhydride or maleimide, and those obtained by a Diels-Alder reaction of isoprene with maleic anhydride or an N-substituted maleimide. These cyclic or bicyclic derivatives have high glass transition temperatures. Examples of dicarboxylic reagents include maleic acid, maleic anhydride, fumaric acid, mesaconic acid, itaconic acid, citraconic acid, itaconic anhydride, citraconic anhydride, monomethyl maleate, monosodium maleate, etc.

The copolymers of the vinyl aromatic monomers with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic monomer to a temperature at which the vinyl aromatic monomer will polymerize, (2) stirring the polymerizing vinyl aromatic monomer while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic monomer is polymerizing. Procedures for preparing such copolymers are known in the art and have been described in, for example, U.S. Pat. No. 2,971,939.

In one embodiment, the copolymer may be a styrene-maleic anhydride copolymer. The styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150, 250, 350 and 700 which are believed to be blends and/or grafts of SMA with SBR.

Other examples of impact modified styrenic and alpha-methyl styrene copolymers with maleic anhydride and acrylonitrile include Arvyl 300 MR and 300 CR.

Low molecular weight styrene-maleic anhydride copolymers (Mw as low as 1500) also are useful and these are available commercially such as from Monsanto under the designation "Scripset" and from Atochem under the designation "SMA Resins". Sulfonated styrene-maleic anhydride copolymers (and their metal salts) also are available and useful in this invention. Two such products are available from Atochem: SSMA-1000 which is a sulfonated copolymer of about 50% styrene and 50% maleic anhydride; and SSMA 3000, a sulfonated SMA comprising about 75% styrene and 25% maleic anhydride.

Useful block copolymers of a vinyl aromatic compound and a conjugated diene may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered polymer blocks can be incorporated in the multi-block copolymers by copolymerizing a mixture of conjugated diene and vinyl aromatic monomer monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene(isoprene), 2,3-dimethyl- 1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40, or from about 40,000 to about 300,000.

The average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10 to about 80%, and the vinyl content is preferably from about 25 to about 65%, particularly 35 to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methyl-styrene-butadiene-alpha-methyl-styrene, alpha-methylstyrene-isoprene-alpha-methyl-styrene, and their partially hydrogenated derivatives. The diblock and triblock polymers are commercially available from a variety of sources under various tradenames. An example of a commercially available diblock resin includes Solprene 314D (Phillips). A number of styrene-butadiene-styrene triblock polymers are sold by the Shell Chemical Company under the trademarks "Kraton 2103", "Kraton 2104", and "Kraton 2113". Such thermoplastic rubbery block polymers are made by anionic polymerization, and the above three identified Shell Kratons differ in molecular weight and viscosity, and also in the ratio of butadiene to styrene. For example, "Kraton 2103" and "Kraton 2113" have a styrene to butadiene ratio of 28:72 while "Kraton 2104" as a styrene to butadiene ratio of 30:70. Blends of diblock and triblock polymers are also available. Kraton 1118 (Shell) is a blend of SB diblock and SBS triblock polymers. A particularly useful styrene-butadiene block copolymer is Kraton G1701X.

Multiblock polymers of styrene and either isoprene or butadiene also are commercially available. Commercially available and preferred styrene-butadiene multiblock polymers include Stereon 841A (43% styrene:57% butadiene) and Stereon 845A which are available from The Firestone Tire & Rubber Company.

Radial or starblock copolymers are available from Fina under the general designation "Finaprene SBS Polymer". A particularly useful radial or starblock polymer is available commercially under the designation "Finaprene 414".

The selective hydrogenation of the block polymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5 to about 20% of their original unsaturation content prior to hydrogenation.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.2 to about 20%, and preferably from about 0.1 to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429; 4,657,970; and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated polymers of styrene and butadiene include Kraton FG1901X from Shell, often referred to as a maleated selectively hydrogenated SEBS polymer.

The ethylene-vinyl acetate (EVA) copolymers which may be used as resin coating F include any ethylene-vinyl acetate copolymer generally containing at least about 5% by weight of vinyl acetate, generally, from about 5% to about 50% by weight of vinyl acetate. In one embodiment, ethylene-vinyl acetate copolymers have vinyl acetate contents from about 10%, or about 15%, or about 25% up to about 40%, or about 20% by weight.

In general, the ethylene vinyl acetate copolymers have a melt flow range from about 0.1 to about 150 g/10 min., preferably about 0.1 to about 10 g/10 min., more preferably about 0.1 to about 2 g/10 min.

The preparation of the EVA copolymers may be carried out according to known methods. A typical method of preparing EVA copolymers is found in U.S. Pat. No. 3,506,630 which is incorporated herein by reference. Another method of preparing EVA copolymers is described in U.S. Pat. No. 3,325,460 which is also incorporated by reference. The ethylene-vinyl acetate copolymers which may be used in the present invention are available commercially and are known to those skilled in the art. Examples of commercially available ethylene-vinyl acetate copolymers include Elvax 265, 3120, and 3165 available commercially from DuPont Chemical Company. EVA resins also are available from Exxon Chemical, Union Carbide Corp. and Quantum Chemical.

The polymer resin coating (F) may also contain other additives normally used in resin coatings to improve the desirable properties thereof. For example, the resin coatings may contain filler materials such as solid particulate inorganic fillers in amounts ranging up to about 40% or 50% by weight. Examples of filler materials which may be utilized include mica, silica, wollastonite, glass fibers, talc, graphite platelets, graphite fibers, boron fibers, sapphire fibers, steel fibers, or polymeric or polyester fibers.

In one embodiment, the polymeric resin coating (F) is applied as an emulsion onto the lower and exposed surface of the polyolefin film, and the mixture is allowed to cure at ambient or elevated temperature while allowing the volatile materials to be removed by evaporation. The thickness of the coating (F) may range from about 1 to about 5 grams/m$^2$ and will generally be from about 2 to 4 grams/m$^2$. In one preferred embodiment, the emulsion is applied to the polyethylene layer by direct gravure coating procedures and thereafter dried.

Figure 3:
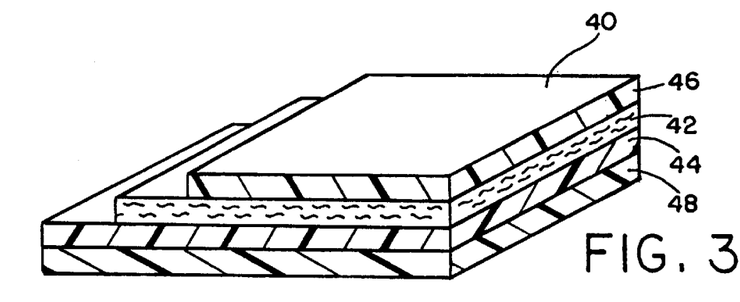
FIG. 3 is a cross-section of another composite laminate in accordance with the present invention which comprises four layers.

A release-coated liner of this embodiment is illustrated in FIG. 3 wherein the liner illustrated generally as 40 comprises a substrate sheet of paper 42, a first coating of polyolefin film 46 on the upper surface of the paper substrate 42, a second coating of polyolefin film 44 bonded to the lower surface of the paper substrate 42, and the coating 48 of a polymer resin which is in contact with and bonded to the lower surface of the second coating of polyolefin film 44.

When the composite laminates having coating (F) of a polymer resin are to be utilized in the preparation of a release-coated liner, the composite comprises in addition to the components (A), (B), (C) and (F) described above, a coating of a release composition which is in contact and bonded to the upper layer of the first coating of polyolefin film (B).

Figure 4:
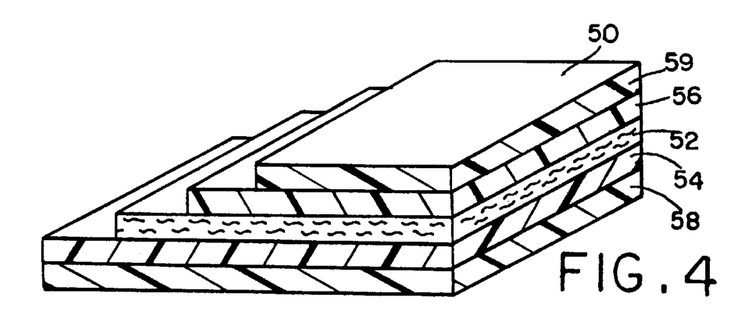
FIG. 4 is a cross-section of a five-layer composite laminate useful as a release liner in accordance with this invention.

A release-coated liner in accordance with this embodiment is illustrated in FIG. 4 and is generally referred to by the reference numeral 50. The release-coated liner composite comprises a substrate sheet of paper 52, a first coating of polyolefin film 56 on the upper surface of the paper substrate 52, a second coating of polyolefin film 54 bonded to the lower surface of the paper substrate 52, a coating comprising a polymer resin 58 in contact with and bonded to the lower surface of the second coating of polyolefin film 54, and a coating of release composition 59 which is in contact with and bonded to the first coating of polyolefin film 56.

The release coating on the liner material (for example, release coating 35 on sheet 36 in FIG. 2 and release coating 59 on sheet 56 in FIG. 4) provides for easy removal of an adhesive-backed face (such as a label, nametag, etc.) from the release liner. The release liner permits the adhesive-coated back surface of the label to adhere lightly to the top surface of the release-coated liner but prevents the adhesive on the back of the label from sticking too tightly to the release liner. That is, if the release liner was not coated with some form of release coating, it would be difficult to remove the release liner from the adhesive-backed face without removing some of the adhesive from the face.

The specific release coating used in the present invention is not critical to the invention. In general, a coating of any release agent can be used, and the suitability of any of the commercially available release coatings can be determined experimentally. In one embodiment, the release coatings include cured silicones (polymethylsiloxanes) and a number of curable silicones are available commercially for this purpose from, for example, the Dow Corning Company and the Goldschmidt Chemical Corp., Hopewell, Va. The radiation-curable silicone release compositions which are commercially available are generally considered preferable.

The radiation-curable silicone release compositions which may be utilized to form the release coating on the liner comprise any of the organopolysiloxanes known in the art which provide release properties and which can be cured by radiation with or without the assistance of a photoinitiator. One type of organopolysiloxane which is useful in preparing release coatings contain acryloxy groups methacryloxy groups or mixtures thereof. A variety of acryloxy or methacryloxy containing organopolysiloxanes are known and can be used for release coatings. In one embodiment, the organopolysiloxane compounds containing acryloxy and/or methacryloxy groups which can be utilized in the present invention may be presented by the general Formula I (I)

wherein each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the organopolysiloxane containing an average of at least one R group which contains an acryloxy or methacryloxy group, namely, (II)

wherein X is hydrogen or methyl. The substituents represented by R in structure IV include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the organopolysiloxane compounds containing acryloxy and/or methacryloxy groups useful in the present invention may be defined as containing from about 3% to about 75% by weight of acryloxy or methacryloxy groups, more often from about 3% to about 50% by weight of the acryloxy or methacryloxy groups. Such polysiloxanes which are useful in this invention have an average molecular weight of from about 1000 to about 20,000. Siloxanes of higher molecular weight also may be used but the higher molecular weight siloxanes are not preferred.

Typically, the R groups in Formula I have the structure (III)

wherein R' is a divalent hydrocarbon group of from 1 to 15 carbon atoms or an oxyalkylene group containing from 1 to about 4 carbon atoms in the alkylene moiety.

The siloxanes containing the acryloxy or methacryloxy groups of Formula III can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The organopolysiloxanes described above may be linear or branched and are preferably substantially linear. As will be recognized by those skilled in the art, the organopolysiloxanes of Formula I will also have an appropriate number of end-capping units, $R_3S_iO$— at the terminals of the molecule where R is as previously defined.

The organopolysiloxanes containing acryloxy and/or methacryloxy groups as described above are generally fluids which have viscosities in the range of from about 25 cps to 10,000 cps. Organopolysiloxanes of the type described above are known in the art, and various methods for producing such organopolysiloxanes are described in U.S. Pat. Nos. 3,878,263; 4,064,286; 4,301,268; 4,306,050; 4,908,274; 4,963,438; 4,978,726; and 5,034,491. The disclosures of these patents are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In another embodiment, the radiation-curable silicone release composition which can be applied to the liner comprises a mixture of at least two classes of materials: (i) an organopolysiloxane containing acryloxy or methacryloxy groups described above, and (ii) acrylated or methacrylated organic polyhydroxy compounds or polyamino compounds. The compounds derived from polyamines contain at least two acrylyl or methacrylyl groups, and the compounds derived from the polyhydroxy compounds contain at least two acryloyl or methacryloyl groups which form a network upon polymerization (curing).

The acrylated or methacrylated organic polyamino compounds useful in the release composition include compounds represented by the general formula $$R-(-C(O)-C(X)=CH_2)_n \qquad (IV)$$

wherein R is derived from a polyamine, and n is an integer of at least 2 and is preferably 2, 3 or 4. In this specification and claims, compounds represented by the general Formula IV above may be referred to as "acrylates" or "methacrylates" for convenience since they are derived from acrylic acid or methacrylic acid even though the compounds formed on reaction of the acid with a polyamine is an amide and not an ester.

The polyamines may be monomeric compounds such as ethylenediamine, 1,3-propanediamine, 1,4-butanediamine, 1,6-hexanediamine, dimethylenetriamine, dipropylenetriamine, triethylenetetramine, etc. The polyamines also may be oligomeric compounds such as dimeric, trimeric or tetrameric polyamino compounds. The acrylated and methacrylated organic polyamino compounds used in the first coating composition and generally represented by the above Formula I may be prepared by techniques well known to those skilled in the art such as by the reaction of a polyamine compound with acrylic acid or methacrylic acid in amounts to provide the desired di-, tri, tetra-, or polyacrylated product. The molecular weights of the acrylated and methacrylated polyamine products may be as high as 2000 and are generally below about 1200. In one embodiment, the molecular weight of the acrylated and methacrylated polyamines is within the range of from about 500 to about 1000. It is preferred that these acrylated and methacrylated polyamine compounds are liquids so that they may be readily blended with the acrylated polyhydroxy compounds. In general, the acrylated and methacrylated polyamine compounds may have viscosities at 25° C. of from about 2 to about 2500 cps., preferably, from about 50 to about 2000 cps., and more preferably between about 400 and about 2000 cps.

Specific examples of acrylated or methacrylated organic polyamino compounds include, for example, N,N'-diacrylylethylenediamine, N,N'-diacrylyl-1,3-propanediamine, N,N'-dimethacrylyl-1,6-hexanediamine, etc. Useful acrylated and methacrylated polyamino compounds are available commercially. An example of a commercially available acrylated amine product is Uvecryl® 7100, an acrylated amine oligomer available from UCB Radcure, Atlanta, Ga. This acrylate functional oligomeric amine is a liquid having a viscosity in the range of 500–1500 cps at 25° C. and theoretical molecular weight of 800.

The acrylated or methacrylated organic polyhydroxy compound contain at least two acryloyl or methacryloyl groups in order to form a network upon polymerization (curing). Suitable compounds include compounds represented by the general Formula V $$R-(-C(O)-C(X)=CH_2)_n \qquad (V)$$

wherein R is derived from a polyhydroxy compound, X is hydrogen or a methyl group, and n is an integer of at least 2 and is preferably 2, 3 or 4.

The acrylated and methacrylated organic polyhydroxy compounds (ii) useful in the release compositions and represented by the general Formula V may be prepared by techniques well known to those skilled in the art such as by the reaction of a polyhydroxy compound with acrylic acid or methacrylic acid in amounts to provide the desired polyacrylated product which is preferably a di-, tri-, or tetraacrylated product. The molecular weights of the acrylated and methacrylated polyhydroxy compounds may be as high as 2000 and are generally below 1200. In one embodiment, the molecular weight of these compounds is between about 500 to about 1000. It is preferred that these acrylated and methacrylated polyhydroxy compounds are liquids which are not too viscous so that they can readily be blended with the acrylated or methacrylated polyamine (ii). In general, these compounds may have viscosities at 25° C. at from about 2 to about 1000 cps., preferably from about 2 to about 500 cps., and more preferably between about 2 and 300 cps.

The polyfunctional compounds containing at least two hydroxyl groups may be monomeric compounds such as ethylene glycol, diethylene glycol, 1,6-hexanediol, neopentylglycol, trimethylolpropane, pentaerythritol, etc. The polyfunctional compounds containing two or more hydroxyl groups also may be oligomeric compounds such as dimeric, trimeric or tetrameric polyhydroxy compounds.

Specific examples of acrylated and methacrylated organic polyhydroxy compounds include, for example, glycerol diacrylate, diethylene glycol diacrylate, 1,6-hexanediol diacrylate (HDODA), triethylene glycol diacrylate, trimethylol propane triacrylate (TMPTA), neopentyl glycol diacrylate, neopentyl glycol triacrylate, neopentyl glycol tetraacrylate, tripropylene glycol diacrylate (TRPGDA), 1,6-hexanediol dimethacrylate, ethylene glycol dimethacrylate, etc.

All of the acrylated and methacrylated organic polyhydroxy and polyamino compounds described above can be used in combination with the above-described polysiloxanes to form useful release coatings. The weight ratio of (i) organopolysiloxane to (ii) acrylated and methacrylated polyhydroxy and polyamino compounds may vary over a wide range. Thus, the mixture may comprise from about 2% by weight up to about 90% by weight of the polysiloxane and from about 10% to about 98% by weight of the acrylated or methacrylated polyhydroxy and/or polyamino compounds. In another embodiment silicone release compositions can be used which comprise only about 2 to about 7% of the organopolysiloxane and from about 90% to 98% by weight of the acrylated or methacrylated polyhydroxy and/or polyamino compounds. In another embodiment, the release compositions contain from 93% to about 98% by weight of said compounds.

The silicone-release compositions preferably comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In yet another embodiment of the present invention, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates. These monoacrylate compounds normally copolymerize with the polyfunctional acrylates and methacrylates.

The radiation-curable release compositions useful in the present invention optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

In one preferred embodiment, the radiation-curable silicone release compositions used herein comprise (A) from about 2% to about 7% by weight of an organopolysiloxane containing acryloxy groups, methacryloxy groups, or mixtures thereof; (B) from about 30% to about 70% by weight of at last one acrylated or methacrylated polyamine; (C) from about 10% to about 70% by weight of at least one acrylated or methacrylated organic polyhydroxy compound; (D) from about 0% to about 20% by weight of at least one liquid monoacrylate ester; and (E) from about 0% to about 5% by weight of at least one photoinitiator. As mentioned above the photoinitiator is not required for electron beam radiation curing.

The radiation-curable silicone release compositions are produced by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The radiation-curable silicone compositions can be stabilized against premature polymerization during storage by the addition of conventional polymerization inhibitors such as hydroquinone, monomethylether of hydroquinone, phenothiazine, di-t-butyl paracresol, etc. Amounts of 0.1 weight percent or less of the stabilizers are generally effective.

The radiation-curable silicone release composition generally is applied to the liner prior to curing. The amount of silicone release coating applied to the liner may vary over a wide range but generally, a coating weight of from about 0.1 to about 10 or more grams/m$^2$ of release composition is satisfactory. The release compositions may be applied to the liner by any conventional means known in the coating art such as roller coating, curtain coating, brushing, spraying, reverse roll coating, doctor knife, dipping, die coating, etc. In one particular embodiment, the liquid radiation-curable release compositions are applied as a third coating using offset gravure techniques. The liquid being applied to the substrate may be heated or cooled to facilitate the coating process and to alter the coating thickness.

The following examples illustrate the radiation-curable silicone compositions useful as release compositions in the composite laminates of the present invention. Unless otherwise indicated in the following examples, in the specification and in the appended claims, all parts and percentages are by weight, temperatures are in degrees Centigrade, and pressures are at or near atmospheric pressure.

| | %/wt. |
|---|---|
| Example 1 | |
| RC-720 silicone | 5.00 |
| Trimethylol propane triacrylate (TMPTA) | 95.00 |
| Example 2 | |
| RC-726 silicone | 5.00 |
| TMPTA | 60.00 |
| Hexanedioldiacrylate (HDODA) | 35.00 |
| Example 3 | |
| RC-726 silicone | 5.00 |
| TMPTA | 60.00 |
| HDODA | 25.00 |
| ODA (Mixture of octyl and decyl acrylates) | 10.00 |
| Example 4 | |
| RC-450 | 5.50 |
| Uvecryl 7100 | 94.50 |
| Example 5 | |
| RC-450 | 6.00 |
| Uvecryl 7100 | 52.00 |
| TMPTA | 21.00 |
| HDODA | 21.00 |
| Example 6 | |
| RC-726 silicone | 6.00 |
| Uvecryl 7100 | 52.00 |

-continued

|       | %/wt. |
|-------|-------|
| TMPTA | 14.00 |
| HDODA | 14.00 |
| ODA   | 14.00 |

In another embodiment, the dimensional stability and flatness of the composite laminates can be improved further by adding an additional layer of a radiation-cured acrylic composition to the liner. Generally, the radiation-cured acrylic composition layer bonded to the bottom layer of the liner, that is, the layer which is most removed from the layer of release composition. The embodiment is illustrated below in Example J.

The layer of radiation-cured acrylic composition is derived from a radiation-curable acrylic composition which is prepared by blending (i) at least one acrylated or methacrylated organopolyamino compound with (ii) at least one acrylated or methacrylated organic polyhydroxy compound. The acrylated or methacrylated organic polyamino compounds and polyhydroxy compounds utilized in this radiation-curable acrylic compositions have been described above as additives to be included in the radiation-curable silicone release compositions. The description regarding the acrylated or methacrylated organic polyhydroxy compounds and polyamino compounds utilized in the silicone release compositions is hereby incorporated by reference for convenience and brevity.

The radiation-curable acrylic composition which is used to form the optional layer generally comprises (i) from about 30% to about 80% by weight of at least one acrylated or methacrylated organic polyamino compound and (ii) from about 20% to about 70% by weight of at least one acrylated or methacrylated organic polyhydroxy compound as described above. In another embodiment, the radiation-curable acrylic composition (i) from 50% to about 70% of the acrylated or methacrylated organic polyamino compound, and (ii) from about 30% to about 50% by weight of at least one acrylated or methacrylated organic polyhydroxy compound.

When the radiation-curable acrylic composition is to be cured by exposure to non-ionizing radiation such as ultraviolet light, at least one photoinitiator is included in the curable composition in amounts of from about 0.5 to about 5% or even up to about 10% based on the total weight of the radiation-curable composition. Photoinitiators are not required when the radiation-curable composition is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The radiation-curable acrylic compositions are prepared by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The acrylic coating or layer which is bonded to the bottom surface of the liner is obtained by applying the radiation-curable acrylic composition to the bottom surface prior to curing. The acrylic compositions may be applied to the surface as a coating by any conventional means known in the coating art such as by roller coating, curtain coating, brushing, spraying, reverse roll coating, doctor knife, dipping, offset gravure, etc. In one particular embodiment, a liquid radiation-curable acrylic composition is applied to the bottom surface (generally paper) using offset gravure techniques. The liquid being applied may be heated or cooled to facilitate the coating process and to alter the depth of penetration of the liquid into the bottom surface prior to curing. Because of the porous nature of paper, the liquid acrylic composition penetrates into the paper, and as a result of the coating and the penetration, paper which has been coated with the radiation-cured acrylic compositions exhibit many of the desired characteristics of polymer films such as increased strength, durability, etc.

The amount of the radiation-curable acrylic composition applied to the bottom layer may be varied depending upon characteristics desired to be imparted to the layer and the particular formulation of the curable composition. If an excess of the coating composition is applied to the bottom layer, the physical characteristics of the bottom layer may be affected in an undesirable manner. Also, for economic reasons, it is normally desired to apply the lowest amount of coating to obtain the desired results. Typically, the applied coating weights may, depending on the bottom layer and intended use, range from about 0.5 to about 50 or more grams/m$^2$. More often, applied coating weights are from about 1 to about 5 grams/m$^2$. At these levels, the coated paper layer is characterized as having increased dimensional stability, increased strength, increased thermal stability and increased resistance to solvents and moisture. It also has been observed that paper sheets containing an acrylic coating exhibit improved ability to resist curling and maintain their flat and planar characteristics when exposed to harsh atmospheric conditions such as high and low humidity, high and low temperature, etc.

The paper substrates containing the curable acrylic coating as described above can be cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. Photoinitiators are not required for election beam curing. One of the advantages of using radiation to effect cure of the composition is that polymerization takes place rapidly at ambient temperature, and heating is not necessary. The equipment for generating these forms of radiation are well known to those skilled in the art. Electron beam radiation is the presently preferred form of radiation to be used with the compositions of the present invention.

Curing of the acrylic compositions can be effected in a continuous manner by passing the coated substrate through radiation equipment which is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the acrylic compositions varies with such factors as the particular formulation used, type and wavelength of radiation, dosage rate, the atmosphere, energy flux, concentration of photoinitiator (when required), and thickness of the coating. Dosage rates of from 0.1 to about 10 megarads, generally below 4 megarads provide the desirable curing. Generally, the exposure is quite brief and curing is completed in less than about 0.1 to 3 seconds. The actual exposure time required to give proper curing for various release compositions can be readily determined by one skilled in the art with a minimum of experimentation. Excess curing of the release compositions generally should be avoided.

The following examples illustrate the radiation-curable acrylic compositions useful in the composite laminates of the invention.

|  | %/wt. |
| --- | --- |
| Example 7 | |
| Uvecryl ® 7100 | 50 |
| TMPTA | 30 |
| HDODA | 20 |
| Example 8 | |
| Uvecryl ® 7100 | 60 |
| TMPTA | 20 |
| HDODA | 20 |
| Example 9 | |
| Uvecryl ® 7100 | 60 |
| TMPTA | 20 |
| HDODA | 15 |
| ODA (mixture of octyl and decyl acrylates) | 5 |

The laminates of the invention which comprise a face, pressure-sensitive adhesive and liner can be prepared by procedures well known to those skilled in the art. In one embodiment the laminate which comprises the face and the release-coated liner are prepared separately. The pressure-sensitive adhesive is applied to either the back of the face laminate or to the release-coated side of the liner. Generally, the adhesive is applied to the release-coated liner. The face and liner are then brought into contact to form the desired laminate which may be a sheet label, tape, decal, etc. In another embodiment the pressure-sensitive adhesive is applied to a face laminate and the various layers of the release-coated liner are applied individually to the adhesive side of the face laminate.

In another embodiment of the laminate of the invention which comprises a face, pressure-sensitive adhesive and liner, the laminate is characterized as having a "balanced" or "symmetrical" construction. These laminates exhibit improved properties such as improved resistance to curling over a wide range of temperatures, including very low temperatures. These laminates are considered "balanced" or "symmetrical" because the face laminate and the liner laminate are of identical construction, and when the composite laminate is prepared with a pressure-sensitive adhesive, the liner composite is reversed whereby the liner composite is the mirror image of the face composite. The following composite is an example of a composite having a "balanced" or "symmetrical" construction, and the composite comprises the following layers from top to bottom: 7-pound high-density polyethylene (matte)/41-pound paper/ 18-pound linear low-density polyethylene/pressure-sensitive adhesive/release coating/18-pound liner low-density polyethylene/41-pound paper/7-pound high-density polyethylene (matte)/paper or polymer resin coating such as a styrene-acrylate resin coating. Specific examples of such balanced symmetrical construction is found in Examples K–O.

The following examples illustrate the construction of the composite laminates of this invention. Reference to "pound" refers to number of pounds per ream.

EXAMPLE A

Substrate: 41-pound off-set graded bleached Kraft paper.
First Coating: 7-pound high-density polyethylene.
Second Coating: 18-pound linear low-density polyethylene (density of about 0.921).

EXAMPLE B

Substrate: 50-pound bleached Kraft paper.
First Coating: 18-pound linear low-density polyethylene.
Second Coating: 7-pound high-density polyethylene.

EXAMPLE C

Substrate: 41-pound off-set graded bleached Kraft paper.
First Coating: 7-pound high-density polyethylene.
Second Coating: 7-pound high-density polyethylene.

EXAMPLE D

Substrate: 41-pound off-set graded bleached Kraft paper.
First Coating: 18-pound linear low-density polyethylene.
Second Coating: 18-pound linear low-density polyethylene.

EXAMPLE E

Substrate: 50-pound bleached Kraft paper.
First Coating: 18-pound linear low-density polyethylene.
Second Coating: 7-pound high-density polyethylene.
Third Coating: pressure-sensitive adhesive (acrylic terpolymer, about 23 grams/m$^2$).

EXAMPLE F

Substrate: 50-pound bleached Kraft paper.
First Coating: 18-pound linear low-density polyethylene.
Second Coating: 7-pound high-density polyethylene.
Third Coating: pressure-sensitive adhesive (acrylic terpolymer, about 23 grams/m$^2$).

EXAMPLE G

Face:
 Substrate: 41-pound bleached Kraft paper.
 First Coating: 7-pound high-density polyethylene.
 Second Coating: 18-pound linear low-density polyethylene.
Adhesive:
 Third Coating: pressure-sensitive adhesive (acrylic terpolymer, about 23 grams/m$^2$).
Liner:
 Release Coating: Electron beam cured silicone of Example 6 applied at about 2 to about 5 grams/m$^2$.
 78-pound bleached Kraft Paper.

EXAMPLE H

Face:
 Substrate: 50-pound bleached Kraft paper.
 First Coating: 18-pound linear low-density polypropylene.
 Second Coating: 7-pound high-density polypropylene.
Adhesive:
 Third Coating: pressure-sensitive adhesive (acrylic terpolymer, about 23 grams/m$^2$).

Liner:
Release Coating: Electron beam cured silicone of Example 5 (2 to about 5 grams/m²).
66-pound linear low-density polyethylene.

EXAMPLE I

Face:
Substrate: 41-pound bleached Kraft paper.
First Coating: 7-pound high-density polyethylene.
Second Coating: 18-pound linear low-density polyethylene.
Adhesive:
Third Coating: pressure-sensitive adhesive (acrylic terpolymer, about 23 grams/m²).
Liner:
Release Coating: Electron beam cured silicone of Example 6 applied at about 2 to about 5 grams/m².
18-pound linear low-density polyethylene.
41-pound bleached Kraft paper.

EXAMPLE J

Face:
Substrate: 50-pound bleached Kraft paper.
First Coating: 18-pound linear low-density polyethylene.
Second Coating: 7-pound high-density polypropylene.
Adhesive:
Third Coating: pressure-sensitive adhesive (acrylic terpolymer, about 23 grams/m²).
Liner:
Release Coating: Electron beam cured silicone of Example 6 applied at about 2 to about 5 grams/m².
18-pound linear low-density polyethylene.
50-pound bleached Kraft paper.
Cured acrylic mixture of Example 9 applied at about 1 to 3 grams/m².

EXAMPLE K

Face:
Substrate: 41-pound bleached Kraft paper.
First Coating: 7-pound high-density polyethylene.
Second Coating: 18-pound linear low-density polyethylene.
Adhesive:
Third Coating: pressure-sensitive adhesive (acrylic terpolymer, about 23 grams/m²).
Liner:
Release Coating: Electron beam cured silicone of Example 6 (about 2 to about 5 grams/m²).
18-pound linear low-density polyethylene.
41-pound bleached Kraft paper.
7-pound high-density polyethylene.
11-pound tissue paper.

EXAMPLE L

Face:
Substrate: 41-pound bleached Kraft paper.
First Coating: 7-pound high-density polyethylene.
Second Coating: 18-pound linear low-density polyethylene.
Adhesive:
Third Coating: pressure-sensitive adhesive (acrylic terpolymer, about 23 grams/m²).
Liner:
Release Coating: Electron beam cured silicone of Example 6 (about 2 to about 5 grams/m²).
18-pound linear low-density polyethylene.
41-pound bleached Kraft paper.
7-pound high-density polyethylene.

EXAMPLE M

Face:
Substrate: 41-pound bleached Kraft paper.
First Coating: 7-pound high-density polyethylene.
Second Coating: 18-pound linear low-density polyethylene.
Adhesive:
Third Coating: pressure-sensitive adhesive (acrylic terpolymer, about 23 grams/m²).
Liner:
Release Coating: Electron beam cured silicone of Example 6 applied at about 2 to about 5 grams/m².
7-pound high-density polyethylene.
41-pound bleached Kraft paper.
18-pound low linear density polyethylene.

EXAMPLE N

Face:
Substrate: 41-pound off-set graded bleached Kraft paper.
First Coating: 7-pound high-density polyethylene.
Second Coating: 18-pound linear low-density polyethylene.
Adhesive:
pressure-sensitive adhesive (acrylic terpolymer, about 23 grams/M²).
Liner:
Release Coating: Electron beam cured silicone of Example 6 (about 2 to about 5 grams/m²).
10-pound medium density polyethylene.
68-pound Kraft paper.
9-pound linear low-density polyethylene.
11-pound tissue paper.

EXAMPLE O

Face:
Substrate: 41-pound bleached Kraft paper.
First Coating: 7-pound high-density polyethylene.
Second Coating: 18-pound linear low-density polyethylene.
Adhesive:
Third Coating: pressure-sensitive adhesive (acrylic terpolymer, about 23 grams/m²).
Liner:
Release Coating: Electron beam cured silicone of Example 6 applied at about 2 to about 5 grams/m².
7-pound high-density polyethylene.
41-pound bleached Kraft paper.
18-pound low linear density polyethylene.
Styrene-acrylate resin backing (about 3 grams/M²).

The composite laminates of the present invention exhibit improved strength, thermal stability, dimensional stability, tear-resistance and moisture-resistance. The composite laminates also exhibit reduced shrinkage and reduced curling subjected to laser printing or pass through copying machines and in use. In particular, the composite laminates of the present invention exhibit reduced curling when used under adverse conditions such as when used in freezers such as freezers of retain grocery stores.

The ability of the composite laminates of the present invention to resist curling in both room temperature and at 0° F. environments is determined and demonstrated in the following Label Curling Test.

Sample Preparation:

(1) From each of the labels to be tested, one 3-inch by 4-inch samples is die-cut in the machine direction, and this sample is labeled "machine direction" with an arrow indicating the machine direction.

(2) With the face side of the machine direction sample (M.D.) down, a utility knife and ruler is used to score a line one-half-inch from the edge, across the 3-inch side of the sample and through the "liner" only.

(3) Remove or score strip the ½-inch section of liner and apply one sample to the center of a galvanized steel panel.

(4) At this time, each steel panel should have a sample for a machine direction (M.D.).

Procedure:

(1) An initial measurement of curl is made on each of the samples from an "end on view" at the left, center and right positions of the machine direction (M.D.).

(2) Place one panel in a laboratory freezer at 0° F. (±5° F.).

(3) After a given period (24 hours) in the freezer, the panel is removed from the freezer and measurements are taken immediately from an "end on view" at the left, center and right positions of the machine direction (M.D.).

(4) When the measurements are completed on the freezer samples, the samples are allowed to thaw at room temperature for about 60 minutes, and the measurements of the curl are repeated.

(5) The freezer samples are then returned to the freezer for an additional period, whereupon the samples are removed from the freezer and the curl from an "end on view" at the left, center and right positions of each of the samples on the panel is again measured.

(6) After allowing the samples to thaw at room temperature for one hour, the measurements of the curl are repeated and recorded.

(7) The freeze (5) and thaw (6) cycles may be repeated as desired.

The results of the evaluation of several examples of the composite laminates of the present invention in the Label Curling Test are summarized in the following table. The results demonstrate the desirable resistance to curling exhibited by the composite laminates of the invention.

| | Label Curling Test CURL (inches) | | | |
| --- | --- | --- | --- | --- |
| | MD | | | |
| | Left | Center | Right | Average |
| Composite K | | | | |
| Initial | 0.00 | 0.10 | 0.10 | 0.07 |
| 120 Hours Freezer Dwell | 0.00 | 0.05 | 0.00 | 0.02 |
| 60 Minute RT Dwell | 0.10 | 0.10 | 0.05 | 0.08 |
| 144 Hour Freezer Dwell | 0.15 | 0.20 | 0.15 | 0.17 |
| 60 Minute RT Dwell | 0.00 | 0.20 | 0.00 | 0.07 |
| 168 Hour Freezer Dwell | 0.20 | 0.30 | 0.20 | 0.23 |
| 60 Minute RT Dwell | 0.00 | 0.20 | 0.00 | 0.07 |
| 192 Hour Freezer Dwell | 0.15 | 0.30 | 0.20 | 0.22 |
| Composite L | | | | |
| Initial | 0.00 | 0.00 | 0.00 | 0.00 |
| 120 Hours Freezer Dwell | 0.05 | 0.00 | 0.05 | 0.03 |
| 60 Minute RT Dwell | 0.00 | 0.00 | 0.05 | 0.02 |
| 144 Hour Freezer Dwell | 0.00 | 0.00 | 0.00 | 0.00 |
| 60 Minute RT Dwell | 0.00 | 0.00 | 0.00 | 0.00 |
| 168 Hour Freezer Dwell | 0.00 | 0.00 | 0.00 | 0.00 |
| 60 Minute RT Dwell | 0.10 | 0.20 | 0.40 | 0.23 |
| 192 Hour Freezer Dwell | 0.05 | 0.00 | 0.00 | 0.02 |
| 60 Minute RT Dwell | 0.00 | 0.00 | 0.00 | 0.00 |
| Composite M | | | | |
| Initial | 0.20 | 0.40 | 0.70 | 0.43 |
| 120 Hours Freezer Dwell | 0.10 | 0.40 | 0.60 | 0.37 |
| 60 Minute RT Dwell | 0.00 | 0.00 | 0.00 | 0.00 |
| 144 Hour Freezer Dwell | 0.00 | 0.00 | 0.10 | 0.03 |
| 60 Minute RT Dwell | 0.10 | 0.30 | 0.40 | 0.27 |
| 168 Hour Freezer Dwell | 0.10 | 0.30 | 0.40 | 0.27 |

-continued

| | Label Curling Test CURL (inches) | | | |
| --- | --- | --- | --- | --- |
| | MD | | | |
| | Left | Center | Right | Average |
| 60 Minute RT Dwell | 0.00 | 0.00 | 0.00 | 0.00 |
| 192 Hour Freezer Dwell | 0.05 | 0.30 | 0.40 | 0.25 |
| 60 Minute RT Dwell | 0.00 | 0.20 | 0.30 | 0.17 |

The composite laminates which are prepared in accordance with the present invention and which have been described above exhibit improved strength, thermal stability, dimensional stability tear-resistance, solvent-resistance and moisture-resistance. An additional significant property of the composite laminates of the present invention is their ability to lay flat and remain in a flat condition on aging even when subjected to extreme environmental conditions such as high and low humidity, high and low temperatures, etc. The surface characteristics of the composite laminates of the invention, and in particular, the characteristics of the second coating of the polyethylene film on the surface of the composite laminate renders the construction laser imageable with or without the application of primers, inks and overvarnishes. The images which are deposited on the surface are bright and exhibit good toner anchorage.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composite comprising
   (A) a first sheet of paper;
   (B) a first coating of polyethylene or polypropylene film having a printable upper surface and a lower surface bonded to the upper surface of the first sheet of paper;
   (C) a second coating of polyethylene or polypropylene film having its upper surface bonded to the lower surface of the first sheet of paper;
   (D) a third coating comprising a pressure-sensitive adhesive on the lower surface of the second coating of polyethylene or polypropylene film;
   (E) a release-coated liner comprising at least one layer of sheet material wherein the release coated surface of the liner is in contact with the third coating of pressure-sensitive adhesive.

2. The composite of claim 1 wherein the release-coated liner comprises at least one layer of paper and/or at least one layer of polymer film.

3. The composite of claim 1 wherein the first coating is a high-density polyethylene film and the second coating is a low-density polyethylene film having a density of from about 0.910 to about 0.925.

4. The composite of claim 1 wherein the first coating is a low-density polyethylene film having a density of from about 0.910 to about 0.925, and the second coating is a high-density polyethylene film having a density of from about 0.940 to about 0.965.

5. The composite of claim 1 wherein the release coating comprises a silicone.

6. The composite of claim 5 wherein the silicone is a radiation-cured silicone.

7. The composite of claim 5 wherein the silicone release composition comprises, prior to curing (i) from about 2% to about 7% by weight of an organopolysiloxane containing acryloxy groups, methacryloxy groups, or mixtures thereof, and (ii) from about 90% to about 98% by weight of at least one acrylated or methacrylated organic polyhydroxy compound or polyamino compound.

8. The composite of claim 1 wherein the release-coated liner comprises at least one layer of paper.

9. The composite of claim 1 wherein the release-coated liner comprises at least one layer of a polymer film.

10. The composite of claim 1 wherein the release-coated liner comprises one layer of first polymeric film having its upper surface with release coating in contact with the layer of adhesive and its lower surface in contact with the upper surface of a second sheet of paper.

11. The composite of claim 10 wherein the lower surface of the second sheet of paper is in contact with the upper surface of a second polymer film.

12. The composite label of claim 11 wherein the lower surface of the second polymer film is in contact with a third sheet of paper.

13. The composite label of claim 11 wherein the first and second polymer films comprise polyethylene.

14. A composite laminate comprising
  (A) a substrate sheet of paper;
  (B) a first coating of polyolefin film having an upper surface and a lower surface wherein the lower surface is in contact with and bonded to the upper surface of the substrate sheet;
  (C) a second coating of polyolefin film having its upper surface in contact with and bonded to the lower surface of the substrate sheet; and
  (D) a resin coating in contact with and bonded to the lower surface of the second coating of polyolefin film, said resin coating having a coefficient of friction which is greater than the coefficient of friction of the second coating of polyolefin film.

15. The composite of claim 14 wherein the polyolefin film in the first and second coatings is a polyethylene or polypropylene film.

16. The composite of claim 14 wherein the polyolefin films in the first and second coatings are polyethylene.

17. The composite of claim 14 wherein the resin coating (D) comprises a styrene-acrylate copolymer resin.

18. The composite of claim 14 also containing a release coating on the upper surface of the first coating.

19. The composite of claim 18 wherein the release coating comprises a silicone.

20. A composite comprising
  (I) a face laminate comprising
    (A) a first sheet of paper;
    (B) a first coating of a polyolefin film having a printable upper surface and a lower surface bonded to the upper surface of the first sheet of paper; and
    (C) a second coating of polyolefin film having its upper surface bonded to the lower surface of the first sheet of paper;
  (II) a coating comprising a pressure-sensitive adhesive in contact with and bonded to the lower surface of the second coating of the face laminate; and
  (III) a release-coated liner laminate comprising
    (D) a substrate sheet of paper;
    (E) a first coating of polyolefin film having its lower surface in contact with and bonded to the upper surface of the substrate sheet;
    (F) a second coating of polyolefin film having its upper surface in contact with and bonded to the lower surface of the substrate sheet; and
    (G) a release coating on the upper surface of the first coating wherein the release coating also is in contact with the lower surface of the coating of pressure-sensitive adhesive.

21. The composite of claim 20 wherein the polyolefin film of the first coating of the face laminate is identical to the polyolefin film of the second coating of the liner laminate, and the second coating of the face laminate is identical to the first coating of the liner laminate.

22. The composite of claim 20 wherein the liner also comprises, a resin coating in contact with and bonded to the lower surface of the second coating of polyolefin film of the liner wherein said resin coating has a coefficient of friction which is greater than the coefficient of friction of the second coating of the liner laminate.

23. The composite of claim 22 wherein the resin coating comprises a styrene acrylate copolymer resin and an inorganic particulate filler.

24. The composite of claim 20 wherein the first and second polymer films of the face and liner comprise polyethylene.

25. The composite of claim 21 wherein the first coating of the face laminate is a high-density polyethylene film and the second coating of the face laminate is a low-density polyethylene film.

26. The composite of claim 20 wherein the release coating comprises a silicone.

* * * * *